(12) United States Patent
Mao et al.

(10) Patent No.: US 8,407,092 B2
(45) Date of Patent: Mar. 26, 2013

(54) METERING IN A DATA PROCESSING SYSTEM

(75) Inventors: Wenbo Mao, Bradley Stoke (GB); Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 4054 days.

(21) Appl. No.: 10/415,449

(22) PCT Filed: Oct. 30, 2001

(86) PCT No.: PCT/GB01/04799
§ 371 (c)(1),
(2), (4) Date: Oct. 24, 2003

(87) PCT Pub. No.: WO02/37354
PCT Pub. Date: May 10, 2002

(65) Prior Publication Data
US 2004/0068447 A1    Apr. 8, 2004

(30) Foreign Application Priority Data
Oct. 31, 2000   (GB) .................................. 0026620.5

(51) Int. Cl.
*G06Q 30/00*    (2012.01)

(52) U.S. Cl. ................ 705/14.45; 705/14.41; 705/14.73
(58) Field of Classification Search ................. 705/1–28
See application file for complete search history.

(56) References Cited

PUBLICATIONS

Moni Naor, Benny Pinkas, Secure accounting and auditing on the Web, Computer Networks and ISDN Systems, vol. 30, Issues 1-7, Proceedings of the Seventh International World Wide Web Conference, Apr. 1998, pp. 541-550, ISSN 0169-7552, DOI: 10.1016/S0169-7552(98)00116-0. (http://www.sciencedirect.com/science/article/B6TYT-3WRC342-16/2/1bb0843769c.*
Mao, Wenbo, Verifiable Partial Sharing of Integer Factors, SAC'98, LNCS 1556, pp. 94-105, 1999 (hereafter Mao); downloaded on Feb. 17, 2009 at: http://www.springerlink.com/content/ral97g6lm6c0xgyt/fulltext.pdf.*

* cited by examiner

*Primary Examiner* — Scott D Gartland

(57) ABSTRACT

A data processing system is described wherein use of resources in the system is metered. Metering evidence is generated which is difficult to forge and is, thus, relatively resistant to tampering. Such a system finds application, for example, in the field of metering the amount of time a person spends reading advertisement that are published on the World Wide Web. If reliable, such metering evidence may be used by the owner of the web server that contains the advertisement to bill the originator of the advertisement.

25 Claims, 2 Drawing Sheets

METERING IN A DATA PROCESSING SYSTEM

TECHNICAL FIELD

The present invention relates to metering in a data processing system. In particular, although not exclusively, the invention relates to the generation of metering evidence which is relatively difficult to forge and relatively resistant to tampering.

BACKGROUND

Use of the Internet, especially the world-wide-web (www or web), is rapidly growing. Accompanying this growth is a growth in the number and kind of new services which can potentially be offered over the Internet. With many new services in future, the inventors expect that there will need to be many different models for billing the various parties who may be involved in providing, using and supporting the service. Specifically, increasingly, electronic services supplied over a public network, such as the Internet, are expected to require metering in terms of the length of time or the number of instances of the service usage.

DISCLOSURE OF THE INVENTION

In accordance with a first aspect, the present invention provides a method of metering activity of a data processing system resulting in the generation of respective tamper-resistant metering evidence, the tamper-resistance of the metering evidence being attributable to the difficulty of factorising a large integer, which has only two prime factors of roughly equal size.

As described in more detail hereafter, the activity may take different forms. In some embodiments, the activity may comprise metering user activity or user interaction with a data processing system or process. For example, the activity may comprise a user reading an advertisement displayed by the data processing system. Alternatively, the activity may be a user using a software application such as a game, a word processor or the like. In other embodiments, the activity may involve the data processing system executing a process that requires little or no user interaction. Indeed, the activity may comprise interaction purely between data processing systems involving no user interaction. For example, in a distributed data processing environment, one data processing system may need to interact autonomously with one or more other data processing systems in order to complete a task. In such circumstances, it might be advantageous if each data processing system could meter use of its resources by other data processing systems for future billing or auditing purposes.

In a preferred embodiment, the method comprises iteratively evaluating the result of a mathematical function using the large integer as an input to the function, and using a result of one iteration of the function as an input to a next iteration of the function.

Other embodiments or aspects of the invention will become apparent from reading the following detailed description and claims.

BRIEF DESCRIPTION OF THE DRAWINGS

Embodiments of the present invention will now be described by way of example only with reference to the accompanying drawings, of which.

BEST MODE FOR CARRYING OUT THE INVENTION, & INDUSTRIAL APPLICABILITY

The following exemplary embodiments can be described with reference to FIG. 1, which illustrates only one of a number of possible systems in which the present invention may be practiced using the Internet. It will be apparent, however, that use of the Internet as such is not a requirement of the invention.

Figure 1:
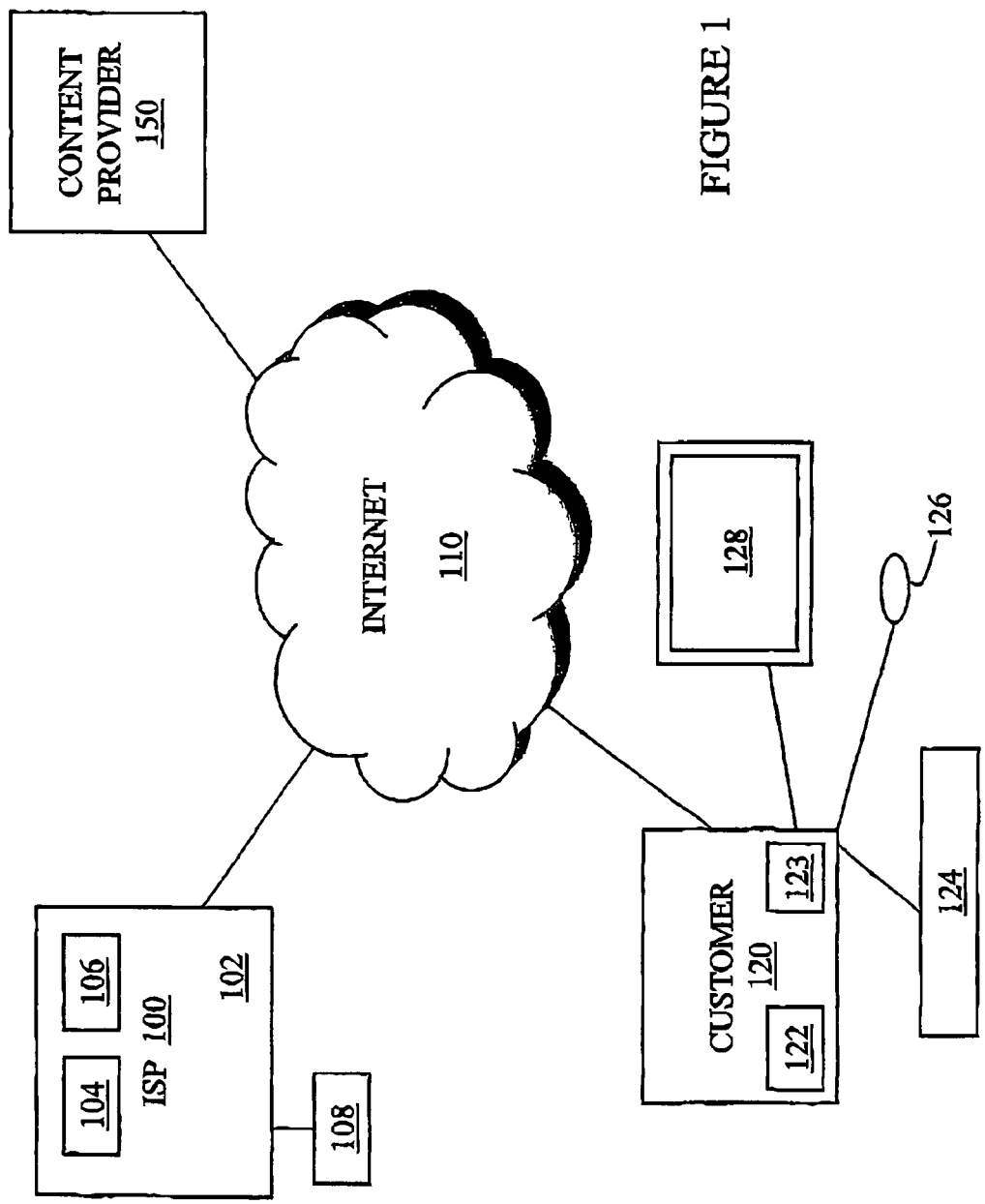
FIG. 1 is a block diagram of a distributed system suitable for enacting the present invention.

In FIG. 1, an ISP 100 is connected to, and is accessible via, the Internet 110 in the usual manner. In this instance, the ISP 100 comprises a conventional computer system 102, for example a Windows NT or UNIX based system, having at least one processor running a web server process 104, or simply a web server, and an ISP metering process 106. The ISP 100 also includes storage 108, such as a hard disk drive, for storing a large number of web pages, which can be downloaded by a customer using a respective computer system 120.

A customer computer system 120 comprises a conventional computer system running a web browser process 122 such as Internet Explorer or Netscape Navigator, and a customer metering process 123. The browser 122 is controlled to access the Internet and download data such as web pages from remote sources such as the ISP 100 in the conventional manner. The downloaded data are processed by the web browser 122, for example to display web pages and additionally (or alternatively) execute downloaded mobile code or other applications. The user controls the operation of the browser process 122 with a standard interface such as a keyboard 124 or mouse 126 and any results are displayed on a visual display unit 128 in the usual way. The customer can download web pages or other content from the ISP 100 by entering the respective web page address into the browser process 122 or by controlling the mouse to 'click' on an appropriate 'hyperlink' in the usual manner.

Also shown in FIG. 1 is a content provider 150, which originates content to be stored by the ISP 100 and made available by the ISP to customers over the Internet 110.

The content provider 150 may also comprise a conventional computer system 150, which may be connected directly to the ISP 100 or via the Internet 110. Alternatively, the content provider 150 may simply provide content to the ISP 150 in advance, for example on a storage medium such as CD-ROM or floppy disk. For the present purposes, the content provider 150 is connected to the ISP 100 via the Internet 110 in such a way that it can communicate with the ISP 100.

According to a first embodiment, an advertisement service is provided in which the content provider 150 is an advertiser and the content is web-based adverts or web pages containing adverts.

By way of background to the first embodiment, the electronic commerce potential of the Internet, in particular of the world-wide-web (WWW or web), has brought forward a now business of offering free access to the Internet. Organisations such as Geocities (www.geocity.com), Yahoo! (www.yahoo.com), BT (www.btinternet.com), Dixons (www.freeserve.net), and TESCO (www.tesco.co.uk/indexn.htm) are a few examples of free Internet Service Providers (ISP). Web advertising is considered one of the sources of revenue for free ISPs. Compared with the traditional hardcopy-printing-based advertising, the web version is cost effective, speedy and can be conveniently connected to shopping over the Internet. For example, after viewing an advert, a customer can order goods right away with a single mouse click. Another important advantage of web advertising over paper-based advertising is the ease of collecting data relating to consumers' purchasing behaviour and of mining that information. Such information is a valuable commodity for a seller.

The cost of placing an advert typically has a close relationship to the popularity of the medium containing the advert. It is important, therefore, to be able to measure the popularity of a webpage in order to determine an appropriate charge for an advert. In addition, when an advertiser is also an ISP (e.g., in the case of TESCO), it will naturally like to encourage the customers (e.g., clubcard or loyaltycard holders) to spend more time on reading the adverts. Many organisations provide customers with so-called 'clubcards' or 'loyaltycard' whereby each time the customer purchases a product or service he acquires extra 'points', which may be used to gain discounts on future purchases. Therefore, granting clubcard or loyaltycard points according to the time spent on an advert page might be an appropriate incentive for customers to spend time reading adverts. For instance, if a customer opens a webpage containing an advert, and spends a while (say one minute) reading the advert, they can earn one point. The more time the customer spends on reading adverts, the more points they will collect.

Figure 2:
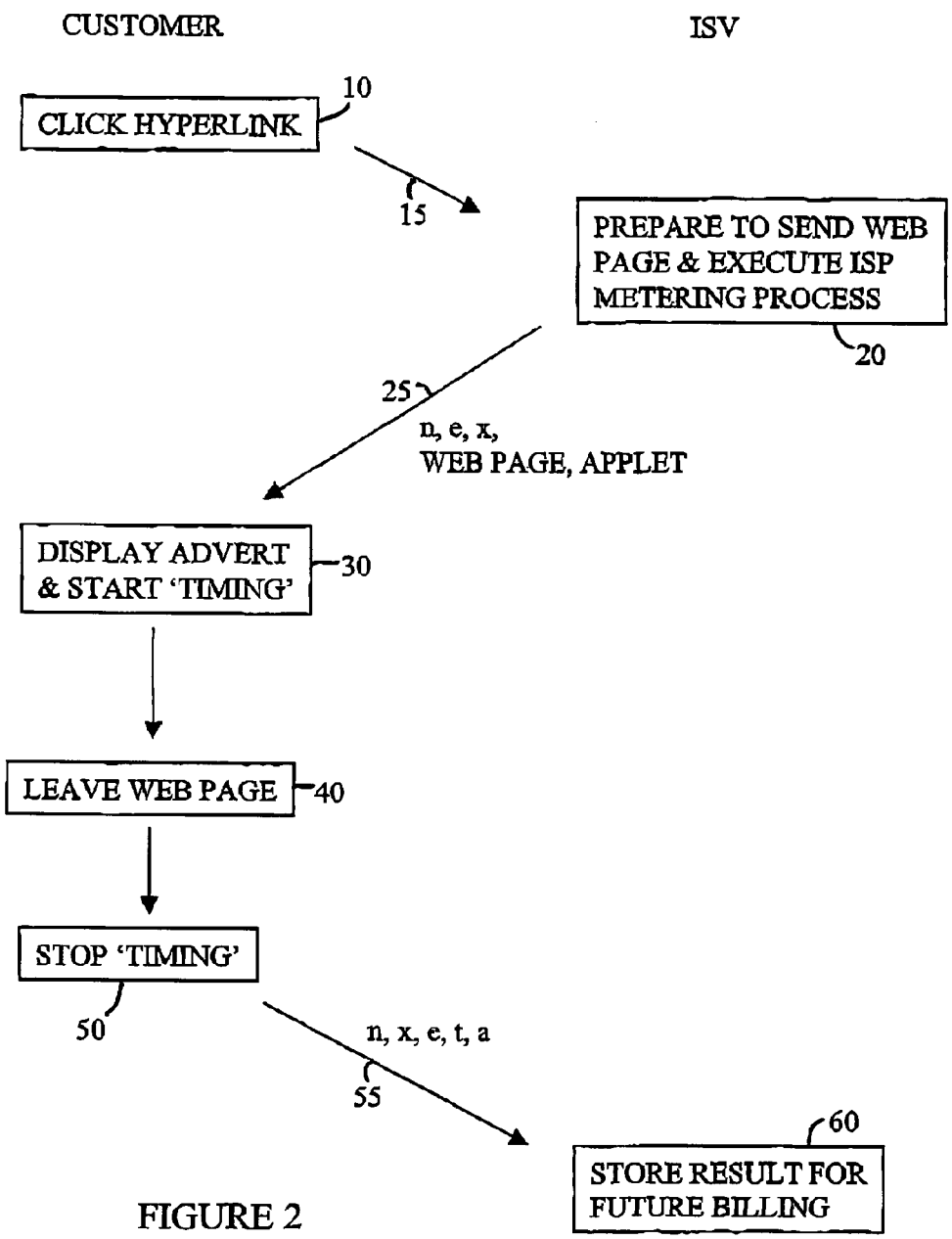
FIG. 2 is a flow diagram illustrating the main steps involved in enacting the first embodiment of the present invention.

An exemplary process for metering a customer reading adverts will now be described with reference to FIG. 2.

First, in step 10 the customer 'clicks' on a hyperlink to download from the ISP 100 a web page containing an advert. This causes the browser 122 to generate a message 200, which is sent to the ISP 100 via the Internet 100 in step 15. Once received by the ISP 100, the web server 104 prepares the requested web page for transmission back to the customer 120 in step 20. In addition, in step 20, the web server 104 executes the ISP metering process 106, which generates mobile code including a number n, a number e and one further number, x The mobile code may be in the form of a Java Applet. The ISP metering process 106 returns the mobile code and the numbers (n, x, e) to the web server 104 and the ISP 100 sends back to the customer 120 the web page containing the advert accompanied by the mobile code and the three numbers (n, x, e), all in step 25.

The number n is a large positive integer, which has only two prime factors p and q of roughly equal size. In other words, n=pq. If the advertiser 150 does not trust the ISP 100, then the advertiser 150 may itself generate n, and forward it to the ISP, but keep p and q secret. This may be done in advance of any advert download request or on demand. The number e is defined below: e=2^u+1 (mod λ(n)) where u is a positive integer roughly equal to (log_2 n)/2; and mod λ(n) denotes the least common multiple of p−1 and q−1. As in the case of n, e is fixed during the system setup stage and is made public. Finally, x is a random positive integer less than n, which may be generated by the advertiser 150 or by the ISP 100.

The customer 120 receives the web page, the mobile code and the numbers (n, x, e), and the web browser 122 displays the web page containing the advert in step 30. Also in step 30, during the time the customer reads the advert, the customer metering process 123 executes the mobile code automatically to calculate values of a and t, according to the following simple, iterative 'Timing' algorithm:

Timing(n, x, e)
    a ← h(x); y <- a; t ← 1;
    while ("customer reads the web page") {
        a ← y a^e mod n;

-continued t ← t + 1;
    }
    return (t, a);
end.

In the algorithm above, h( ) denotes a secure one-way hash function that the system has agreed; the symbol ← means "is made equal to". For example, in the second line of the algorithm, variable 'a' is made equal to the value of integer 'h(x)'. The algorithm iterates while the customer reads the web page. Each iteration represents one 'tick' of the Timing algorithm. The number of ticks accumulated is represented by the value of t.

When the customer leaves the web page, in step 40, for example by clicking on another web page or by closing the web browser, the mobile code stops executing the Timing algorithm In step 50 and the customer metering process 123 returns the respective metering result (n, x, e, t, a) to the ISP 100 in step 55. Thus, the metering result is evidence of the time the customer spent reading the advert web page.

The metering result value a satisfies:

$$a = h(x)^b \pmod{n}, \text{ where } b = 1 + e + e^2 + \ldots + e^t \pmod{\lambda(n)}$$

Here λ(n)=lcm(p−1, q−1), the least common multiple of p−1 and q−1.

Let exponentiation modulo n take a unit of time. Then, generating a valid pair (t, a) using Timing takes t ticks, or units, of time. The Timing algorithm is intrinsically sequential, which means there is no obvious way to parallelise the procedure with an aim of saving time. One may compute the exponent b' first and then perform one exponentiation modulo n. However, without the knowledge of the order of x, the exponent $$b' = 1 + e + e^2 + \ldots + e^t \tag{1}$$

Is not compact, which means that the size of b' is t|n| (here |n| means the bit size of n in binary representation). Therefore, the exponentiation using the large exponent b' still takes t units of time: a huge space is required while no time is saved. In other words, it would take as long to generate false evidence as it does to generate genuine evidence.

When the ISP 100 receives the metering result (n, x, e, t, a), it stores the result for future billing of the advertiser in step 60. If the advertiser wishes to verify the integrity of the metering result, it can do so using the following efficient method. First, the advertiser 150 calculates $$E \leftarrow e^{(t+1)} \bmod \lambda(n), \tag{2}$$

and then verifies $$a^{(e-1)} = h(x)^{(E-1)} \pmod{n}. \tag{3}$$

If the verification of the congruence (3) passes, the duration evidence is accepted as valid.

This verification algorithm only takes three units of time, since computing (2) and (3) only involves three modular exponentiation. The algorithm also has a constant space complexity of |n|, since E has the same size of n. Thus, the advertiser is able to check a large amount of evidence efficiently. The efficiency is obtained as a result of the advertiser knowing the secret λ(n), which allows him to compute E in (2) in a compact manner.

The advertiser has an efficient procedure to validate a piece of metering evidence. However, it cannot efficiently construct the evidence. Based on (2) and (3), in order to construct the value a, the advertiser needs to compute (E−1)(e−1)⁻¹ mod $\lambda(n)$. But in our definition of e, we have $(e-1)=2^u$, which is not relatively prime to $\lambda(n)$ and therefore $(e-1)^{-1} \bmod \lambda(n)$ does not exist. The only other way to construct the value a other than using t steps (as is done in Timing(n, x, e)) requires the advertiser first to extract the $(2^u)$-th root from $h(x)^{(E-1)}$ (mod p) and the $(2^u)$-th root from $h(x)^{(E-1)}$ (mod q) and then to use the Chinese Remainder Theorem to combine the two results into the $(2^u)$-th root from $h(x)^{(E-1)}$ (mod n). This is prohibitively difficult if a large volume of evidence needs to be forged.

A minor addition to the first embodiment makes it possible for any third party, who does not have knowledge of the secret p and q, to verify the validity of the metering evidence. Specifically, if the customer metering process 123 in addition returns the value of a(t−1), the third party can then generate a by initiallsing the Timing algorithm with the values of a(t−1) and t−1 and iterating the algorithm once to generate a new value a'. Clearly, if a'=a, then this proves that the customer must have run the Timing algorithm to generate the evidence.

In summary, the advertising fees that an advertiser pays an ISP (if they are separate entiles) are dependent on the popularity of the advert web pages, where popularity is taken herein to be proportional to the amount of metering evidence which has been generated for a respective web page. In addition, for example, the number of reward points allocated to a customer can be determined by the size of the metering evidence that a particular customer generates.

For the purposes of associating metering evidence with a particular customer, it is possible for the mobile code to return an identity of a customer with respective metering evidence. In addition, it would be possible to incorporate a numeric customer identifier into the function for generating a. Of course, there are many different functions suitable for generating a; the algorithm above being one very simple example.

In addition, an ISP may try to create time duration evidence with the intention of over-charging an advertiser. This may be the case if the advertiser does not trust the ISP. However, as has already been described above, the only way for the ISP to generate metering evidence is to behave as a customer, which is very labour-intensive if a significant amount of evidence is to be generated. Indeed, the time and resources taken to generate the evidence would probably cost the ISP more than would be gained by the increased advertising revenue.

In a second embodiment of the present invention, the content provider 150 is a software rental company. The software to be rented is stored by the ISP 100 ready for downloading for rental by customers.

According to FIG. 1, in operation, the customer selects the software he wishes to rent by clicking on an appropriate hyperlink. The customer transmits an appropriate message to the ISP 100 via the Internet 110. The ISP 100 receives the message from the customer and interprets it as a request to rent the respective software. In return, the ISP 100 sends the customer the requested software code accompanied by mobile code and the three numbers (n, x, e), as already described above. When the customer runs the software, the meter automatically runs as specified above. The meter runs for as long as the customer uses the software. When the customer finishes using the software, he 'exits' and the meter transmits the metering result back to the software rental company. Customer payment is calculated on the basis of a time (e.g. hourly) usage, for example by debiting the customers bank account or credit card, the details of which may have been entered at the beginning of the process, or may be known in advance from previous dealings. Based on the verification of metering evidence, the ISP 100 can charge the customer and the content provider can charge the ISP, minus any transaction charge levied by the ISP.

Depending on the nature of the software that is being rented, it may be preferable for the software to incorporate the functionality of the mobile code, rather than having the mobile code as a separate piece of functionality. An advantage of this approach is that it is impossible to separate the operation of the Timing algorithm from use of the software, In an alternative form, the software rental embodiment may be arranged such that, after a certain time (e.g. 100 hours) of paid use, the software can be used by the customer without further charge. Such an arrangement is sometimes known as 'rent-to own'. For example, after 100 hours paid use, the customer gets a certificate automatically issued by the programme, including the data values (n, e, t, x, a=f(x, t), a'=f(x, t−1)), where f(x, t) is the output of the Timing algorithm specified above and t−1 equates to 100 hours of paid use. For the purpose of message authentication, the value a=f(x, t) may have been signed by the ISP acting as the meter owner. This certificate proves that the customer has run the programme at least t−1 units of time, and it is universally verifiable. In addition, with this certificate, the customer can run the software on any different computing platform, for example computer 121 in FIG. 1, which is able to verify the validation of the certificate with only one "tick" by using Timing algorithm. In other words, once a computer has access to the Timing algorithm, it can substitute the values n, e, t, x, a'=f(x, t−1) into the algorithm and then simply iterate it one more time. If the iteration results in a=f(x, t), then the computer can be arranged to understand that the customer has genuinely acquired the right to use the software without further payment.

In a third embodiment of the present invention, a customer is able to play games using a 'pay-per-play service'. In a similar fashion to the previous two embodiments, a customer can select and download from an ISP a computer game provided by a game content provider. Accompanying the downloaded game is a 'Timing' meter process, which runs on the customers computer when the customer starts playing the game, and continues for as long as the customer continues to play the game. In this embodiment, for example, the correct values of metering evidence (say, one value for each session) have to be sent to the content provider to keep the game running continuously. In this embodiment, the content provider acts as a meter owner and the ISP acts as a verifier. Based on the verification of metering evidence, the content provider can charge the customer and the ISP can charge the content provider.

The skilled person will appreciate that the present invention finds application in many forms, as well as in those embodiments described above. In addition, the invention may be augmented in many different ways to render it more 'tamper proof', depending on how important security is. For example, where it is essential to be able to reliably identify the customer, or other party, responsible for generating the metering evidence, it might be preferable for the metering evidence to be signed using an appropriate personal certificate of the customer. In this way, it would be extremely difficult for any other party (who does not have knowledge of the certificate) to forge the evidence. For the avoidance of doubt, this additional step may be applied to any of the embodiments described herein.

Furthermore, on close inspection of the above embodiments, it will become apparent that the only information that needs to be provided by the content provider, or indeed by the ISP, is the value n. In fact, n its if may be published by the content provider, and may not need to be supplied by the content provider or ISP each time content is downloaded. For example, assume that n, the Timing algorithm and the values x and e are generally known. Additionally, the customer itself may generate x and e. Then, a customer need only download the content and rely on having already acquired, or generated, the information and means necessary to return appropriate metering information. Of course, under these circumstances, the downloaded content would need to be arranged appropriately so that it could only be displayed or executed if the respective Timing algorithm were operating. However, the skilled person would be aware of many possible techniques for ensuring that this would be the case. For example, the browser may be programmed to only permit viewing or execution of downloaded content when the appropriate Timing algorithm is executing.

Although the above embodiments relate to simple metering tasks relating to user interaction with a process, it will be apparent to the skilled person that the principles described herein have far broader application, for example metering of interactions between data processing systems.

The invention claimed is:

1. A method of metering activity of a data processing system, comprising:
   generating a measure of the activity of the data processing system;
   generating in the data processing system metering evidence using an integer which has only two prime factors, wherein the metering evidence depends on the measure; and
   keeping the prime factors as a secret that is unknown to the data processing system, wherein the metering evidence can be verified as corresponding to the measure through use of the prime factors, wherein:
   generating the metering evidence comprises iteratively evaluating the result of a mathematical function using the integer as an input to the function and using a result of one iteration of the function as an input to a next iteration of the function;
   the metering evidence is a result of an iteration of the mathematical function; and
   the measure indicates a count of the iterations.

2. A method according to claim 1, wherein the mathematical function has the form $y\hat{\ }e \bmod n$, where:
   $n = pq$ is the integer having the two prime factors p and q;
   $e = 2^u + 1 \pmod{\lambda(n)}$ where $\lambda(n)$ is the least common multiple of $p-1$ and $q-1$;
   u is a positive integer;
   n, e and u are made public;
   y is an initial value; and
   a is equal to the value y for an initial iteration and equal to the result of a prior iteration result for iterations after the initial iteration.

3. A method according to claim 2, further comprising:
   evaluating an expression E of the form $e^{(t+1)} \bmod \lambda(n)$, where t is the measure and indicates a count of the iterations of the mathematical function; and
   determining whether $a^{(e-1)}$ is equal to $y^{(E-1)} \pmod n$ to verify whether the metering evidence corresponds to the measure.

4. A method according to claim 1, wherein the activity further comprises user interaction with a process being executed by the data processing system.

5. A method according to claim 1, wherein the activity comprises executing a process that is first downloaded to the data processing system from a remote source.

6. A method according to claim 5, wherein the integer accompanies the process.

7. A method according to claim 1, wherein the activity comprises displaying an advertisement.

8. A method according to claim 1, wherein the activity comprises a user using a software application process.

9. A method according to claim 1, wherein the metering evidence relates to time associated with the activity.

10. A method according to claim 1, wherein the metering evidence relates to processing cycles of the data processing system associated with the activity.

11. A method according to claim 1 in which the metering evidence is used to bill a user for the associated activity.

12. A method according to claim 1, wherein a service provider that is associated with facilitating the activity uses the metering evidence when billing an originator of a commodity delivered by the service provider and associated with the activity.

13. A method according to claim 1, wherein the metering evidence is used to credit a user who is associated with the activity with a reward.

14. A method according to claim 1, further comprising using the prime factors in a process for verification of the metering evidence.

15. A method according to claim 1, further comprising using a final iterative result and a previous iterative result in a process that detects tampering with the metering evidence.

16. A method of metering the amount of time a user spends reading an advertisement comprising the steps:
   displaying the advertisement on a data processing system;
   during display of the advertisement, having the data processing system iteratively evaluate the result of a mathematical function using an integer that has only two prime factors as an input to the function, and using a result of one iteration of the function as an input to a next iteration of the function; and
   recording a value indicating a count of the iterations and a result from a final iteration of the mathematical function to indicate the time that the user spent reading the advertisement.

17. A method of metering use of a process executing on a data processing system comprising the steps:
   executing the process on the data processing system; and
   during execution of the process, iteratively evaluating the result of a mathematical function using an integer that has only two prime factors as an input to the function, and using a result of one iteration of the function as an input to a next iteration of the function.

18. A method of timing the activity of a data processing system comprising executing on the data processing system a process resulting in the generation of a measurement and evidence indicating that the measurement has not been altered, the process comprising iteratively evaluating the result of a mathematical function using an integer as an input to the function, and repeatedly using a result of one iteration of the function as an input to a next iteration of the function so that the evidence is a final result of the mathematical function, wherein the measurement corresponds to a count of the iterations, and verification that the evidence indicates that the measurement has not been altered can be performed using prime factors of the integer.

19. A method according to claim 18, wherein the process is first downloaded to the data processing system from a remote source.

20. A method according to claim 19, wherein the integer accompanies the process.

21. A method of metering activity of a data processing system comprising executing on the data processing system a process resulting in the generation of a measurement and metering evidence, comprising iteratively evaluating the result of a mathematical function using an integer as an input to the function and repeatedly using a result of one iteration of the function as an input to a next iteration of the function so that the metering evidence is a result of the mathematical function, wherein the mathematical function has the form y a^e mod n, where:

n=pq is the integer having the two prime factors p and q;
e=2^u+1 (mod λ(n)) where λ(n) is the least common multiple of p−1 and q−1;
u is a positive integer;
y is an initial value; and
a is equal to the value y for an initial iteration and equal to the result of a prior iteration for iterations after the initial iteration.

22. A method according to claim 21, wherein the process is first downloaded to the data processing system from a remote source.

23. A method according to claim 22, wherein the integer accompanies the process.

24. A method of metering the amount of time a user spends reading an advertisement displayed by a browser, comprising the steps of:

displaying the advertisement using a data processing system that executes the browser;
downloading mobile code to the data processing system;
during display of the advertisement, executing the mobile code on the data processing system to iteratively evaluate the result of a mathematical function using an integer which has only two prime factors as an input to the function, and using a result of one iteration of the function as an input to a next iteration of the function; and
transmitting the value of the function to a service provider when the advertisement is no longer displayed.

25. A method of generating evidence of activity of a data processing system comprising, during the activity, iteratively evaluating the result of a mathematical function including exponentiation mod n, where n is an integer which has only two prime factors, and using a result of one iteration of the function as an input to a next iteration of the function and recording the number of iterations and the result of the last iteration.

* * * * *

UNITED STATES PATENT AND TRADEMARK OFFICE
CERTIFICATE OF CORRECTION

PATENT NO. : 8,407,092 B2
APPLICATION NO. : 10/415449
DATED : March 26, 2013
INVENTOR(S) : Wenbo Mao et al.

It is certified that error appears in the above-identified patent and that said Letters Patent is hereby corrected as shown below:

In the Specification:

In column 3, line 64, delete "y <- a;" and insert -- y←a; --, therefor.

Signed and Sealed this
Thirteenth Day of August, 2013

Teresa Stanek Rea
*Acting Director of the United States Patent and Trademark Office*